US012657614B2

(12) United States Patent
Omori et al.

(10) Patent No.: US 12,657,614 B2
(45) Date of Patent: Jun. 16, 2026

(54) MANAGEMENT SYSTEM, INFORMATION PROCESSING DEVICE, AND PROGRAM

(71) Applicant: KABUSHIKI KAISHA TOSHIBA, Tokyo (JP)

(72) Inventors: Takahiro Omori, Kawasaki Kanagawa (JP); Yuji Sasaki, Yokohama Kanagawa (JP); Le Anh Hoang, Yokohama Kanagawa (JP); Yuji Mori, Yokohama Kanagawa (JP); Yuko Kono, Tokyo (JP); Eri Kinoshita, Yokohama Kanagawa (JP); Masashi Aizawa, Yokohama Kanagawa (JP); Yasuaki Hadame, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 21 days.

(21) Appl. No.: 18/773,933

(22) Filed: Jul. 16, 2024

(65) Prior Publication Data

US 2025/0272730 A1 Aug. 28, 2025

(30) Foreign Application Priority Data

Feb. 27, 2024 (JP) ................................. 2024-027773

(51) Int. Cl.
*G06Q 30/00* (2023.01)
*G06Q 30/0601* (2023.01)

(52) U.S. Cl.
CPC ................................ *G06Q 30/0621* (2013.01)

(58) Field of Classification Search
None
See application file for complete search history.

(56) References Cited

U.S. PATENT DOCUMENTS

| | | | |
|---|---|---|---|
| 9,754,315 B2 * | 9/2017 | Swanson | ............ G06Q 30/0603 |
| 9,823,937 B1 * | 11/2017 | Hayward | ............ G06F 9/44505 |
| 10,423,427 B1 * | 9/2019 | Hayward | ............ G06F 9/44505 |
| 2003/0004595 A1 | 1/2003 | Seimiya et al. | |
| 2012/0221315 A1 | 8/2012 | Yanoo | |
| 2013/0018700 A1 * | 1/2013 | Ervolina | ................ G06Q 10/06 |
| | | | 705/7.31 |
| 2017/0131973 A1 | 5/2017 | Murakami et al. | |
| 2019/0102811 A1 * | 4/2019 | Gupta | ................ G06Q 30/0283 |

(Continued)

FOREIGN PATENT DOCUMENTS

| | | |
|---|---|---|
| EP | 3 206 143 A1 | 8/2017 |
| JP | 2003-15722 A | 1/2003 |

(Continued)

*Primary Examiner* — Mila Airapetian

(74) *Attorney, Agent, or Firm* — Finnegan, Henderson, Farabow, Garrett & Dunner, LLP

(57) ABSTRACT

A management system is configured to manage a configurator configured to select a candidate of a combination of components included in a product. The management system includes a storage part and a controller; the storage part is configured to store configuration information defining data related to the components, data related to a link between the components, and data related to a constraint of the link; and the controller is configured to select the candidate of the combination based on a request accepted from a user, and a rule related to the combination of the components generated from the configuration information.

5 Claims, 12 Drawing Sheets

(56) References Cited

U.S. PATENT DOCUMENTS

2019/0108579 A1* 4/2019 Chowdhary ....... G06Q 30/0611
2022/0036419 A1* 2/2022 Gilani ................ G06Q 30/0621
2023/0394386 A1* 12/2023 Sivasankaran ......... G06Q 10/06

FOREIGN PATENT DOCUMENTS

| JP | 5412905 | B2 | 2/2014 |
|----|---------|----|--------|
| JP | 5532052 | B2 | 6/2014 |
| JP | 5605370 | B2 | 10/2014 |
| JP | 6185148 | B2 | 8/2017 |
| JP | 6960225 | B2 | 11/2017 |
| JP | 2021-15381 | A1 | 2/2021 |
| JP | 2024-58323 | A | 4/2024 |

* cited by examiner

TARGET PRODUCT     UNIT (HIGHER-LEVEL COMPONENT)     MAJOR PART (TARGET COMPONENT)     ACCESSORY PART (LOWER-LEVEL COMPONENT)

MAJOR PART PARAMETER

UNIT PARAMETER

MANAGEMENT SYSTEM, INFORMATION PROCESSING DEVICE, AND PROGRAM

CROSS-REFERENCE TO RELATED APPLICATIONS

This application is based upon and claims the benefit of priority from Japanese Patent Application No. 2024-027773, filed on Feb. 27, 2024; the entire contents of which are incorporated herein by reference.

FIELD

Embodiments described herein relate generally to a management system, an information processing device, and a program.

BACKGROUND

A tool called a configurator determines specifications of a product based on a request from a customer.

DETAILED DESCRIPTION

Figure 1:
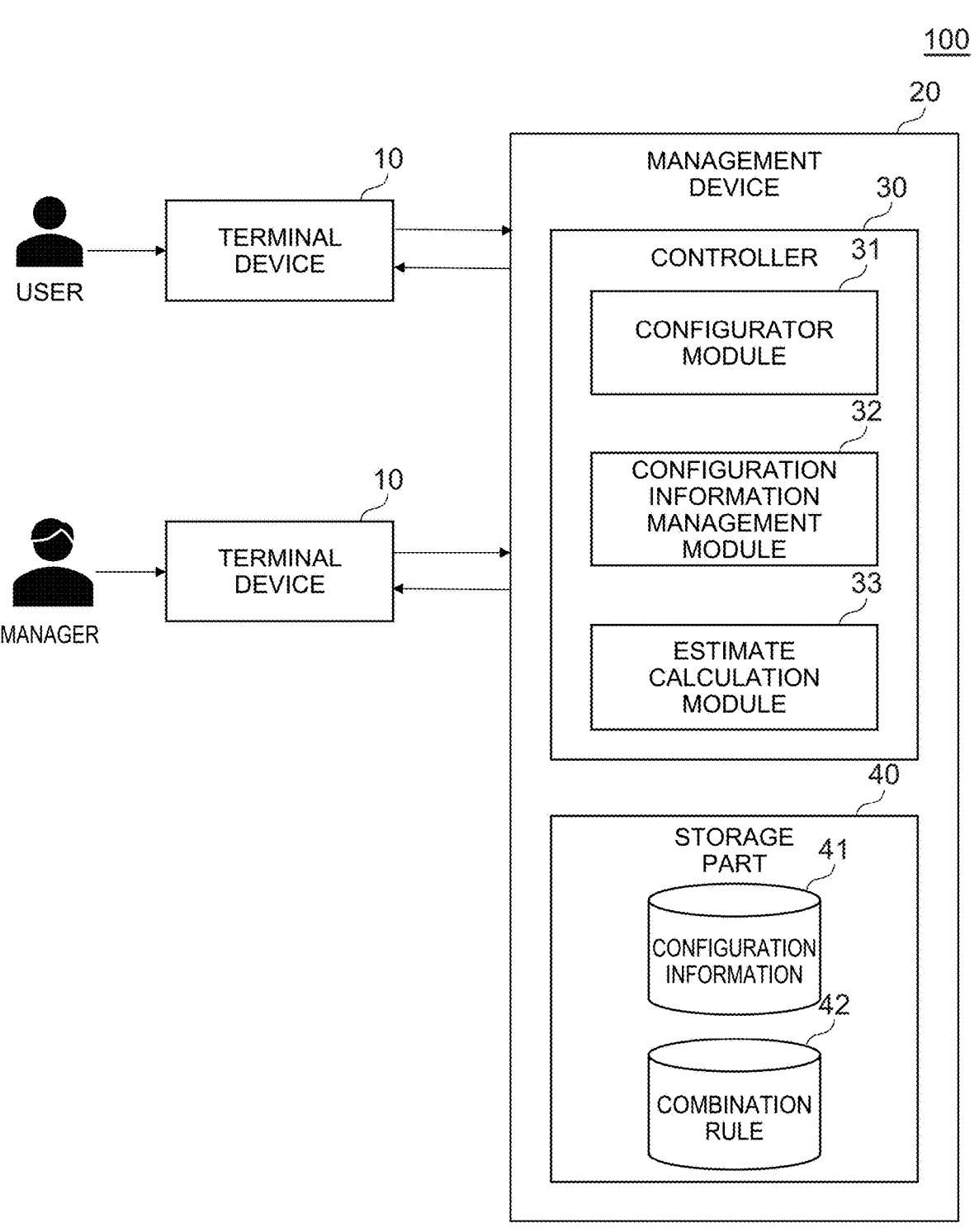
FIG. 1 is a block diagram showing a functional configuration of a management system according to an embodiment.

A management system according to an embodiment is configured to manage a configurator; and the configurator is configured to select a candidate of a combination of components included in a product. The management system includes a storage part and a controller; the storage part is configured to store configuration information defining data related to the components, data related to a link between the components, and data related to a constraint of the link; and the controller is configured to select the candidate of the combination based on a request accepted from a user and based on a rule related to the combination of the components generated from the configuration information.

1. Embodiments

Embodiments of the disclosure will now be described with reference to the drawings. In the specification and drawings, components similar to those already described are marked with the same reference numerals; and a detailed description is not repeated. In the disclosure, "user" means a person who uses the functions of a configurator provided by a management system 100 to determine product specifications, and/or a person that calculates an estimate amount of the specifications. "Manager" means a person that manages the management system 100. The user and the manager may be different, or may be the same person.

1.1. Functional Configuration of Management System 100

A functional configuration of the management system 100 according to an embodiment will now be described with reference to FIG. 1. As shown in FIG. 1, the management system 100 includes a terminal device 10 and a management device 20.

The terminal device 10 is an information processing device including an input part and an output part, and can be operated by a user and a manager. The terminal device 10 may be a general-purpose or special-purpose personal computer, smart device, etc. Smart devices include tablet terminals, smartphones, smart glasses, smartwatches, etc. A hardware configuration of the information processing device functioning as the terminal device 10 is described below.

As an example, the management device 20 is an information processing device that functions as a server. The management device 20 includes a controller 30 and a storage part 40. The controller 30 controls processing of the management device 20 as a processor. The controller 30 includes a configurator module 31, a configuration information management module 32, and an estimate calculation module 33.

The configurator module 31 functions as a configurator that selects a candidate of a combination of multiple components included in a product. Herein, "product" means any article that is manufactured and can be the object of a commercial transaction, and includes examples such as industrial products such as automobiles, household appliances, and the like, as well as factory equipment such as power plants, petrochemical plants, etc. The configurator module 31 accepts a request from the user and presents the user with candidates of combinations of multiple components (specifically, multiple parts of the product) that satisfy the request.

The configuration information management module 32 has the function of managing the configuration information 41 stored in the storage part 40. Data related to the components of the product to be produced (hereinbelow, called the target product), data related to links between the components, and data related to constraints of the links are defined in the configuration information 41. The configuration information management module 32 adds, updates, deletes, etc., the configuration information 41 based on operations of the terminal device 10 by the manager.

The estimate calculation module 33 calculates an estimate of a product including the combination of the parts selected by the configurator module 31. As an example, the estimate calculation module 33 makes an estimate for the entire product by summing the estimate amounts of the parts included in the combination selected by the configurator module 31.

The storage part 40 stores programs and data necessary for the processing of the controller 30, data obtained by the processing of the controller 30, etc. As an example, the storage part 40 stores the configuration information 41 and one or more combination rules 42. As described above, the configuration information 41 includes the data related to the components of the target product, the data related to the link between the components, and the data related to the constraint of the link. The combination rules 42 are rules related to the combinations of the components of the target product, and are generated from the configuration information 41 by the configuration information management module 32.

1.2. Configuration Information 41

The configuration information 41 will now be described with reference to FIGS. 2 to 4. According to the embodiment, the configuration information 41 is defined using a modeling language. A modeling language is a language that is designed, based on common specifications and standards, to model (i.e., abstract and visualize) systems, processes, data, etc. Examples include, but are not limited to, SysML (Systems Modeling Language) or UML (Unified Modeling Language). The specifications may be such that the manager can appropriately select the optimal modeling language according to the configuration of the target product, etc.

Figure 2:
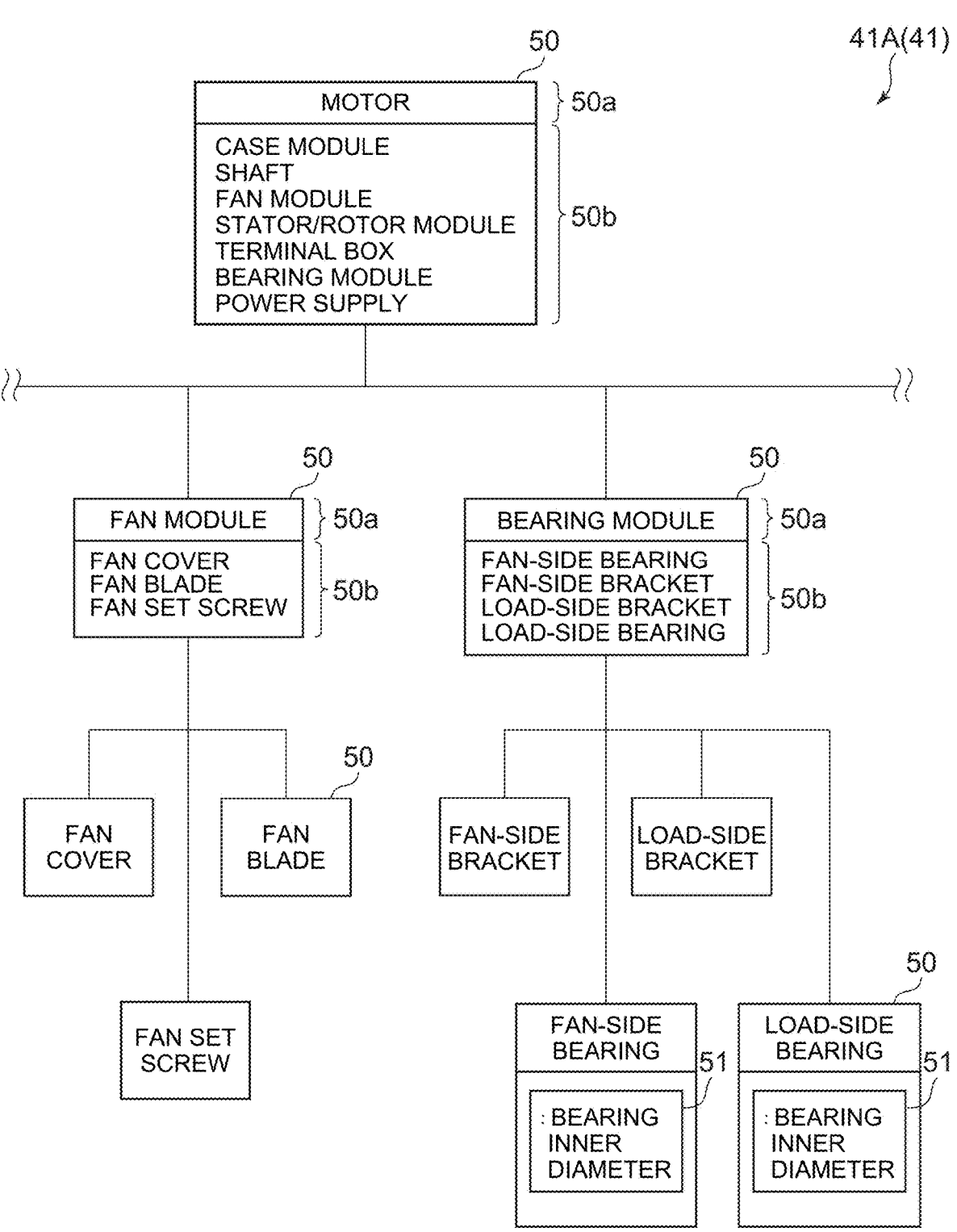
FIG. 2 illustrates component data included in configuration information.

FIG. 2 shows an example of component data 41A included in the configuration information 41. The component data 41A is related to the components included in the target product. As shown in FIG. 2, the component data 41A includes multiple component boxes 50. Each component box 50 corresponds to a part included in the target product as a component, or a module including multiple parts.

The component box 50 includes a part name 50a and accessory parts 50b. The part name 50a is the name of the part as the component. The accessory parts 50b are the names of parts included in the component. As an example, the component data 41A shown in FIG. 2 has a tree structure; and the component box 50 of the uppermost level corresponds to the "motor" part. The "motor" part includes, as accessory parts, the "case module" part, the "shaft" part, the "fan module" part, the "stator/rotor module" part, the "terminal box" part, the "bearing module" part, and the "power supply" part.

The component box 50 further includes data related to one or more parameters associated with the components. "Parameter" means a variable or indicator representing a characteristic of the part as the component. Here, examples of characteristics of the part include, but are not limited to, dimensions, performance, function, shape, material (or material properties), etc. As an example, the component boxes 50 in the lowermost level of the component data 41A shown in FIG. 2 that correspond to the "fan-side bearing" part and the "load-side bearing" part each include parameter boxes 51 corresponding to the "bearing inner diameter" parameter. Therefore, it can be seen that the "fan-side bearing" part and the "load-side bearing" part include the "bearing inner diameter" parameter. There may be multiple fan bearing candidates; and the fan bearings may have different bearing inner diameter parameters. Similarly, there may be other multiple parts including parameters; and the parameters may be different.

Figure 3:
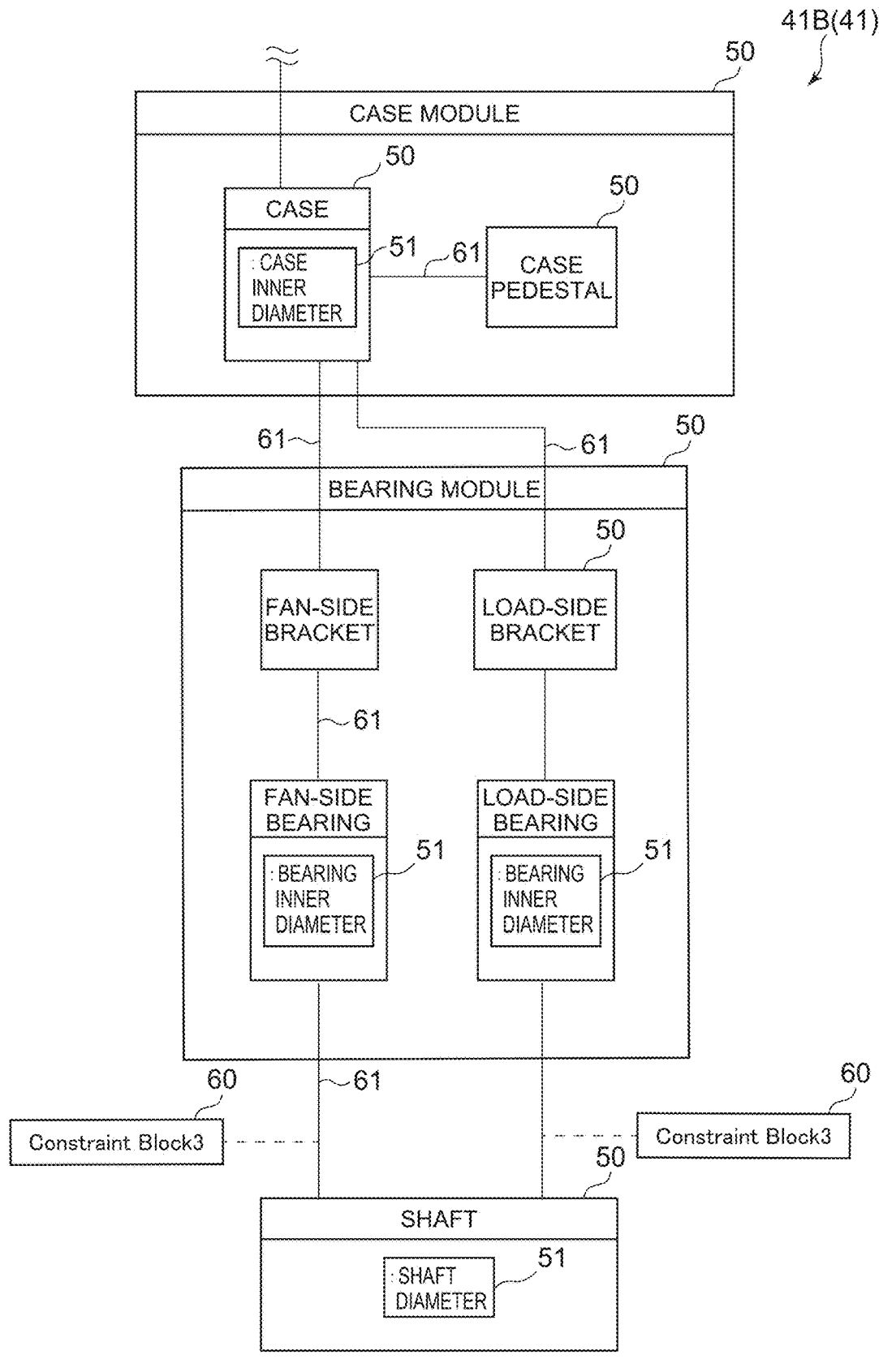
FIG. 3 illustrates data of links included in the configuration information.

FIG. 3 shows an example of link data 41B included in the configuration information 41. The link data 41B is data related to the link between the components included in the target product. As shown in FIG. 3, the link data 41B includes the multiple component boxes 50 and link lines 61 linking the component boxes 50 to each other. The component boxes 50 that are linked by the link line 61 have a prescribed link as parts of the product.

Each component box 50 of the link data 41B may include one or more other component boxes 50. For example, FIG. 3 shows that the "bearing module" part includes the "fan-side bracket" part, the "fan-side bearing" part, the "load-side bracket" part, and the "load-side bearing" part. Thus, the links and inclusion relationships among the components (i.e., the parts) of the target product are visualized more clearly in the link data 41B than in the component data 41A.

Also, a constraint box 60 can be provided in the link line 61. The constraint box 60 corresponds to a constraint condition related to a constraint of the link between the component boxes 50. In the example shown in FIG. 3, the constraint boxes 60 are provided between the "fan-side bearing" part and the "shaft" part and between the "load-side bearing" part and the "shaft" part.

Figure 4:
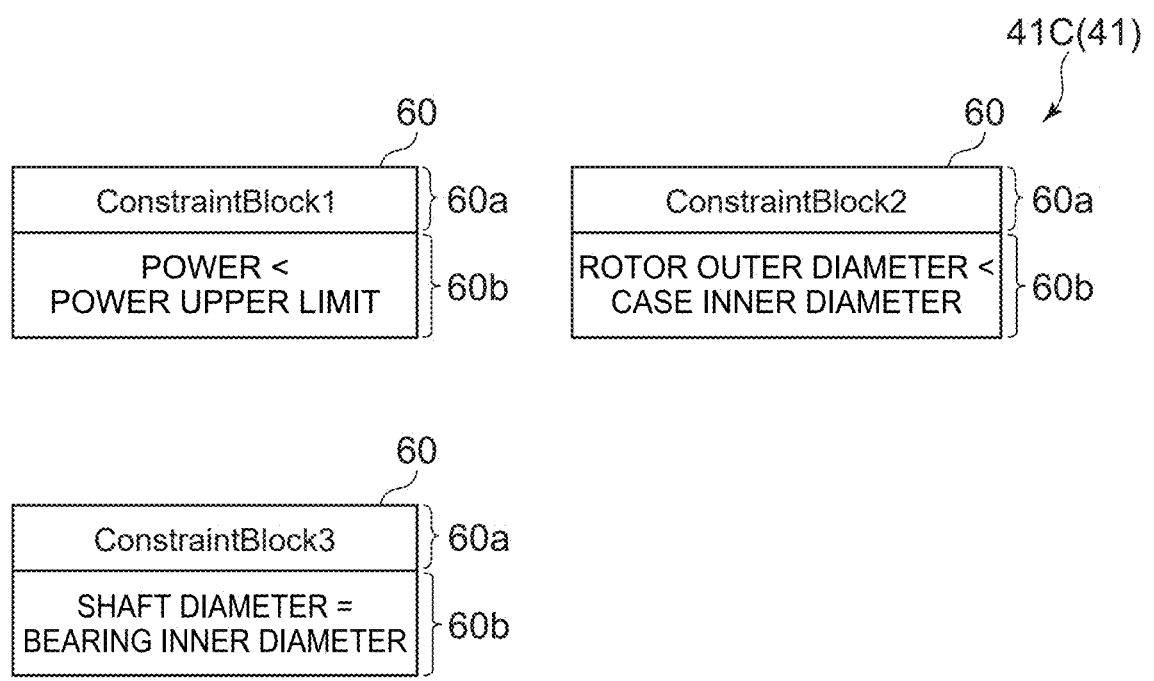
FIG. 4 illustrates constraint data included in the configuration information.

FIG. 4 shows an example of constraint data 41C included in the configuration information 41. The constraint data 41C includes one or multiple constraint boxes 60. As shown in FIG. 4, the constraint boxes 60 include a constraint condition name 60a and condition content 60b. The constraint condition name 60a is the name of the constraint condition. The condition content 60b is the content of the condition. The condition content 60b includes a condition related to the parameters included in the components to be linked.

In the example shown in FIG. 4, the "shaft diameter" parameter and the "bearing inner diameter" parameter being equal is defined as the constraint condition of the condition "ConstraintBlock3". In other words, the constraint condition that the "shaft diameter" parameter and the "bearing inner diameter" parameter are equal is imposed on the links between the "fan-side bearing" part and the "shaft" part and between the "load-side bearing" part and the "shaft" part in FIG. 3.

1.3. Processing Flow

Figure 5:
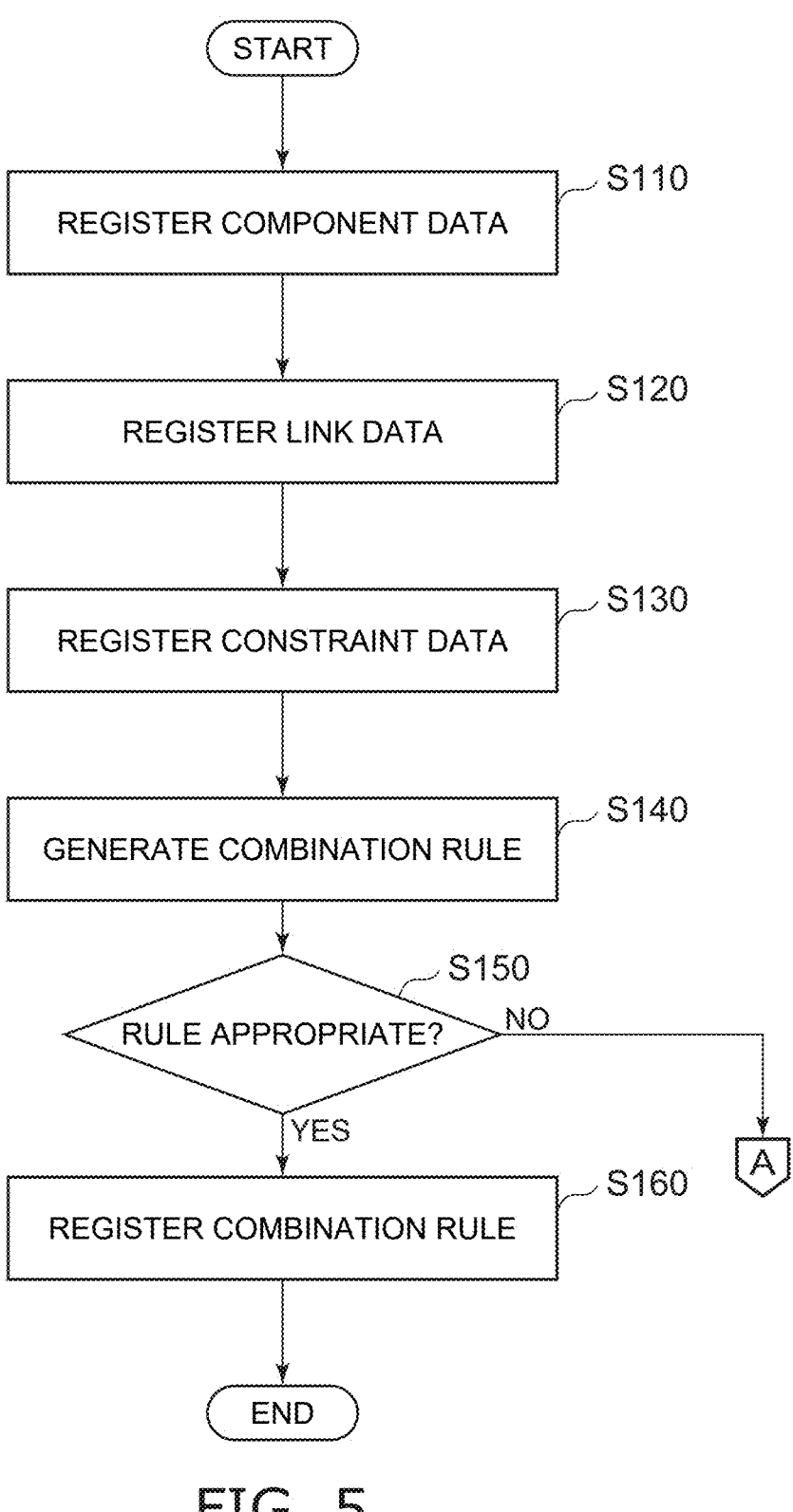
FIG. 5 is a flowchart showing the flow of registration processing of a combination rule of the management system.

The processing flow of the management system 100 will now be described with reference to FIGS. 5 to 8. FIG. 5 is a flowchart showing the flow of registration processing of a combination rule of the management system.

In step S110, the configuration information management module 32 registers, in the component data 41A of the configuration information 41, data related to the parts of the target product based on an operation of the terminal device 10 by the manager.

In step S120, the configuration information management module 32 registers, in the link data 41B of the configuration information 41, data related to the links between the parts of the target product based on an operation of the terminal device 10 by the manager.

In step S130, the configuration information management module 32 registers, in the constraint data 41C of the configuration information 41, the data related to the constraints of the links between the parts based on an operation of the terminal device 10 by the manager. The constraint data 41C is provided to the links between the components in the link data 41B.

In step S140, the configuration information management module 32 generates the combination rule 42 related to a combination of the parts of the target product based on the component data 41A, the link data 41B, and the constraint data 41C of the configuration information 41. As an example, the configuration information management module 32 may refer to the component data 41A and the link data 41B, select a combination of parts that can satisfy the constraint data 41C from a part group including one or more parts, and set the combination of parts as the combination rule 42.

In step S150, the configuration information management module 32 determines whether or not the generated combination rule is appropriate. The determination may be performed automatically by using a predetermined check tool, etc., or may be performed manually by the manager confirming the generated combination rule. Step S160 is performed when the combination rule is appropriate (YES in S150). On the other hand, when the combination rule is inappropriate (NO in S150), the update processing of the combination rule shown in FIG. 6 is performed.

In step S160, the configuration information management module 32 registers the generated combination rule 42 in the storage part 40. As a result, the combination rule 42 for the combination of parts of the target product is stored in the storage part 40.

Figure 6:
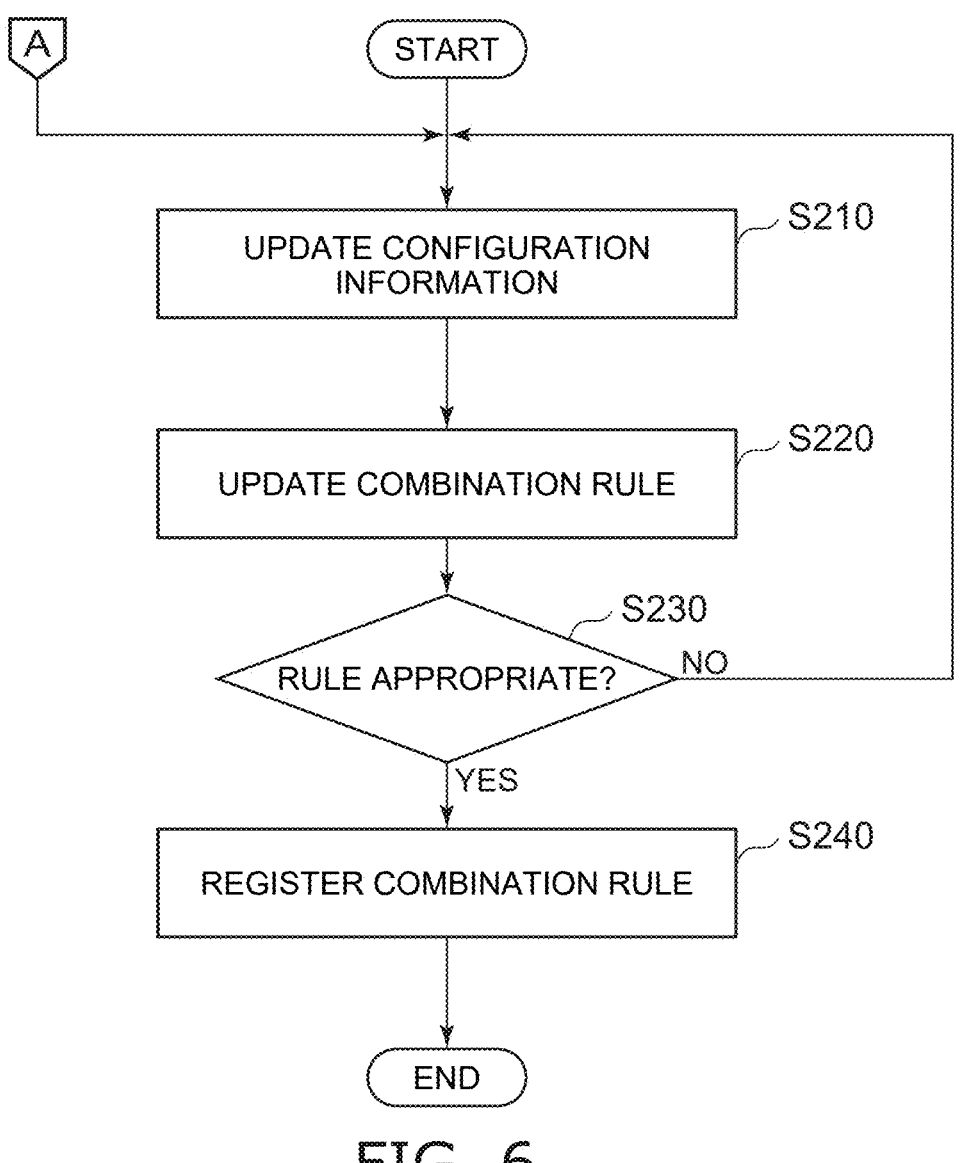
FIG. 6 is a flowchart showing the flow of update processing of the combination rule of the management system.

FIG. 6 is a flowchart showing the flow of the update processing of the combination rule of the management system.

In step S210, the configuration information management module 32 updates the configuration information 41 based on an operation of the terminal device 10 by the manager. The manager updates at least one of the component data 41A, the link data 41B, or the constraint data 41C included in the configuration information 41 as necessary.

In step S220, the configuration information management module 32 updates the combination rule 42 related to the combination of parts of the target product based on the component data 41A, the link data 41B, and the constraint data 41C of the updated configuration information 41.

In step S230, the configuration information management module 32 determines whether or not the updated combination rule is appropriate. When the combination rule is appropriate (YES in S230), step S240 is performed. On the other hand, when the combination rule is inappropriate (NO in S230), step S210 is performed again.

In step S240, the configuration information management module 32 registers the updated combination rule 42 in the storage part 40. As a result, the updated combination rule 42 is stored in the storage part 40.

Figure 7:
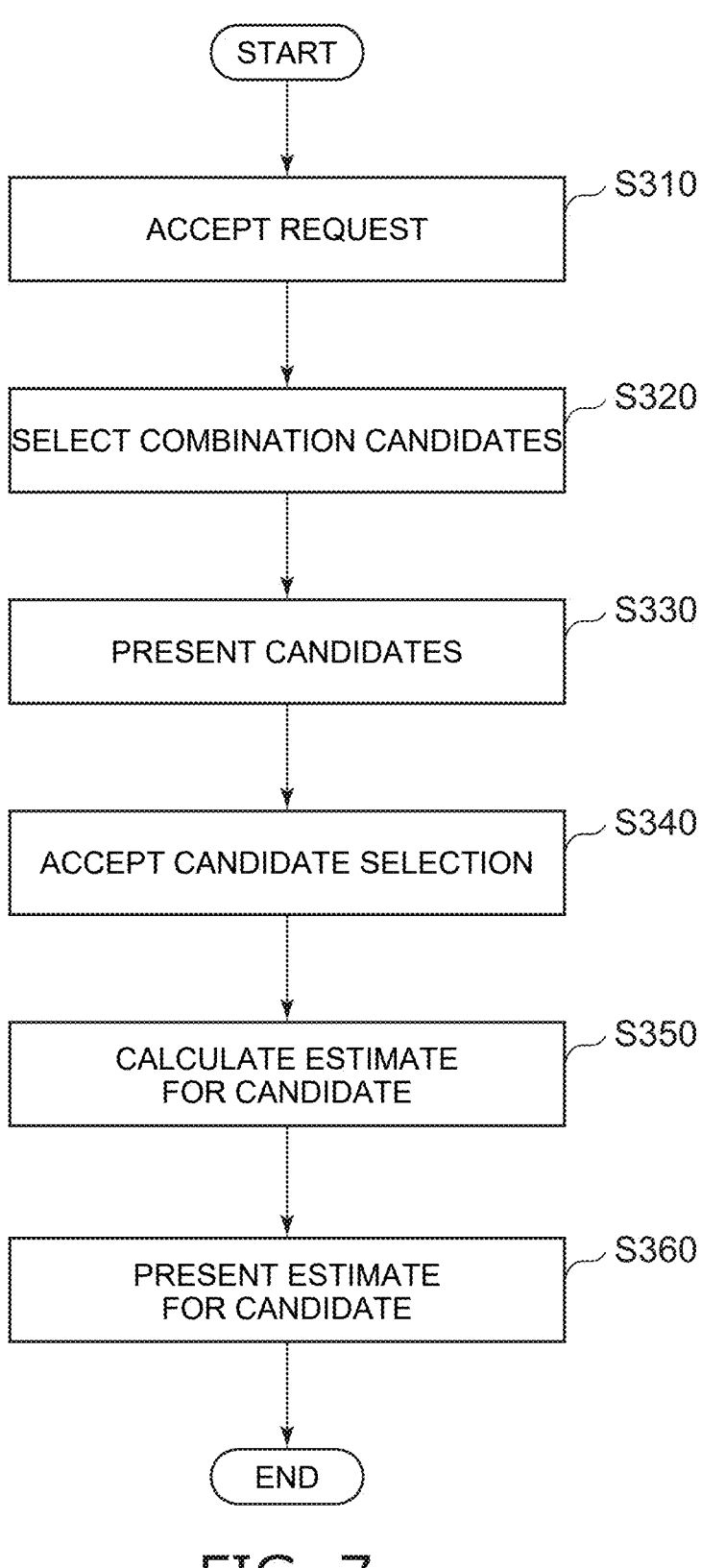
FIG. 7 is a flowchart showing the flow of selection processing of a combination candidate of the management system.

FIG. 7 is a flowchart showing the flow of selection processing of a combination candidate of the management system 100.

In step S310, the configurator module 31 accepts a request related to the target product from a user based on an operation of the terminal device 10 by the user. The request includes a request condition, which is a condition related to a parameter of the parts included in the product. In other words, the request condition included in the request from the user is, for example, a condition related to a variable or indicator related to a dimension, performance, function, shape, or material (or material properties) of a part included in the product.

Figure 8:
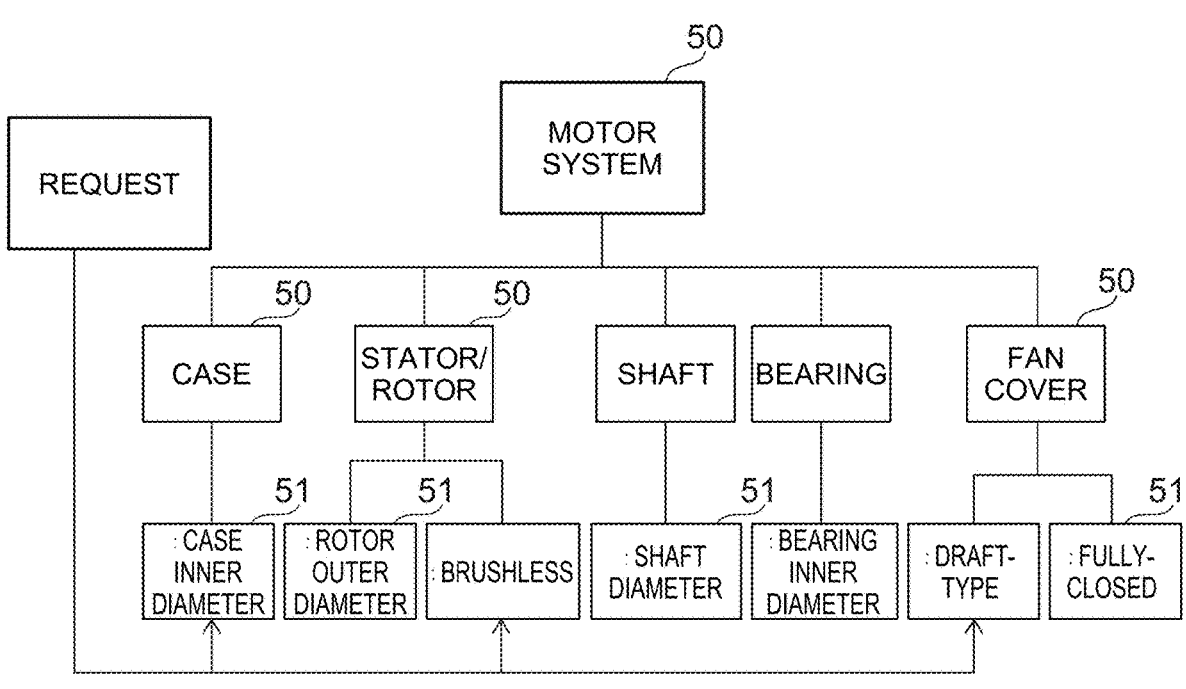
FIG. 8 shows an overview of the selection processing of the combination candidate of the management system.

In step S320, the configurator module 31 refers to the combination rules 42 of the storage part 40 and selects candidates of a combination that satisfies the request condition included in the request accepted from the user. As shown in FIG. 8, the configurator module 31 selects candidates of the combination of the parts satisfying the request condition based on the request condition included in the request accepted from the user and based on one or more parameters associated with the parts included in the target product.

In step S330, the configurator module 31 presents the selected candidates of the part combination. Specifically, the configurator module 31 transmits, to the terminal device 10, data of one or multiple selected candidates of the part combination, and causes the display of the terminal device 10 to display the data.

In step S340, the configurator module 31 accepts a selection of a candidate based on an operation of the terminal device 10 by the user. The user can select a combination of one or multiple parts.

In step S350, the estimate calculation module 33 calculates an estimate for the part combination selected in step S340. As an example, the estimate calculation module 33 calculates the estimate amount for the selected part combination by summing the estimate amounts for the selected parts. The data related to the estimate amount of each part may be included in the component data 41A of the configuration information 41, or may be stored in another database in the storage part 40, etc.

In step S360, the estimate calculation module 33 presents the calculated estimate amount. Specifically, the configurator module 31 transmits, to the terminal device 10, the estimate amount of the selected candidate of the part combination, and causes the display of the terminal device 10 to display the estimate amount.

1.4. Hardware Configuration of Information Processing Device

Figure 9:
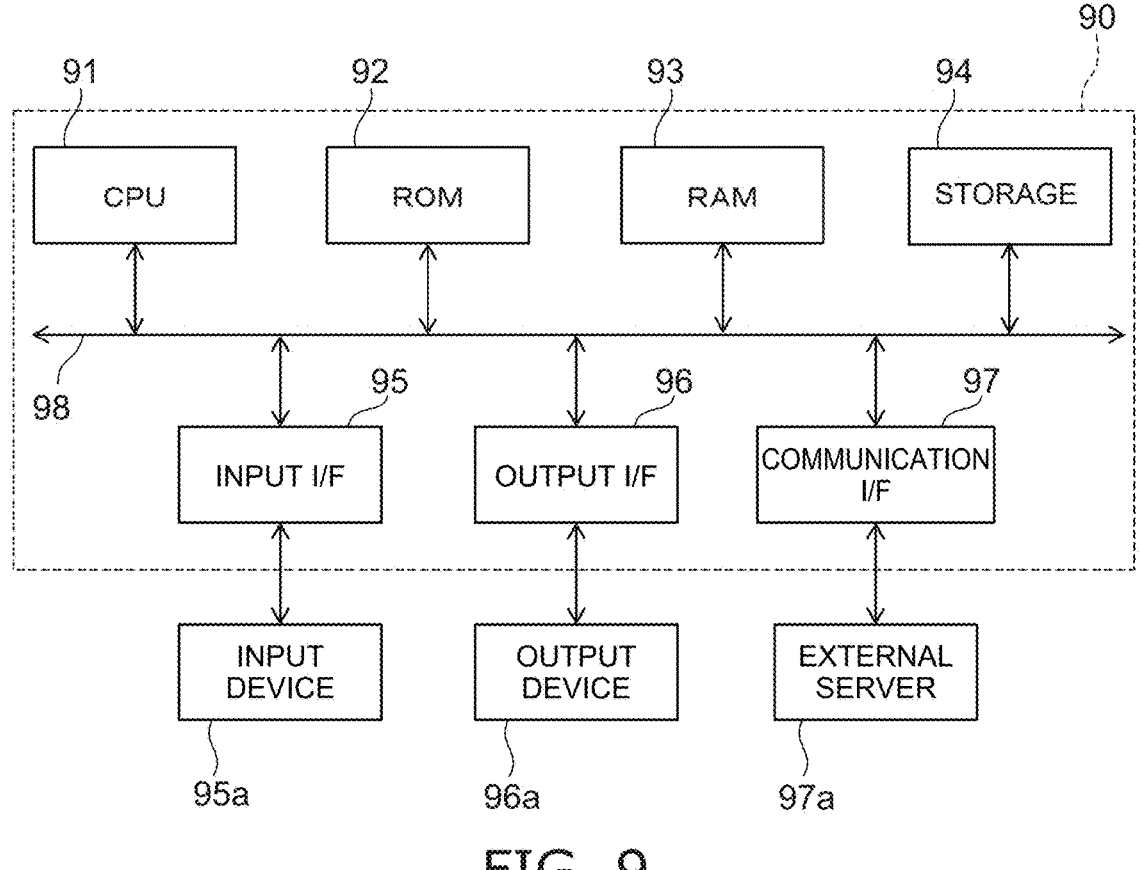
FIG. 9 shows a hardware configuration of an information processing device included in the management system.

A hardware configuration of an information processing device used by the terminal device 10 and the management device 20 will now be described with reference to FIG. 9. As an example, the terminal device 10 and the management device 20 are realized as the information processing device by a computer 90 shown in FIG. 9. The computer 90 includes a CPU 91, ROM 92, RAM 93, storage 94, an input interface 95, an output interface 96, and a communication interface 97.

The CPU 91 functions as a processor executing processing. Specifically, the CPU 91 uses the RAM 93 as work memory to execute a program stored in at least one of the ROM 92 or the storage 94. When executing the program, the CPU 91 executes various processing by controlling configurations via a system bus 98. As an example, the CPU 91 functions as the controller 30.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The storage 94 stores data necessary for executing the programs and/or data obtained by executing the programs. The storage 94 includes at least one selected from a hard disk drive (HDD) and a solid state drive (SSD). As an example, the storage 94 functions as the storage part 40.

The input interface (I/F) 95 is configured to connect the computer 90 and an input device 95a. The input interface 95 is, for example, a serial bus interface such as USB, etc. The CPU 91 can read various data from the input device 95a via the input interface 95.

The output interface (I/F) 96 is configured to connect the computer 90 and an output device 96a. The output interface 96 is, for example, an image output interface such as Digital Visual Interface (DVI), High-Definition Multimedia Interface (HDMI (registered trademark)), etc. The CPU 91 can transmit data to the output device 96a via the output interface 96, and can cause the output device 96a to output the data.

The input device 95a includes at least one selected from a mouse, a keyboard, a microphone (audio input), and a touchpad. The output device 96a includes at least one selected from a display, a projector, a printer, and a speaker. A device such as a touch panel that functions as both the input device 95a and the output device 96a may be used.

The communication interface (I/F) 97 is configured to connect the computer 90 and an external server 97a outside the computer 90. The communication interface 97 is, for example, a network card such as a LAN card, etc. The CPU 91 can read various data from the external server 97a via the communication interface 97.

The processing that is executed by the terminal device 10 or the management device 20 may be realized by one computer 90 or may be realized by the collaboration of multiple computers 90.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD+R, DVD+RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a processor to execute the instructions recited in the program based on the program. In the computer, the acquisition (or the reading) of the program may be performed via a network.

1.5. Summary

Thus, the management system 100 according to the embodiment includes the storage part 40 and the controller 30; the storage part 40 stores the configuration information 41 that defines the data related to the components of the target product, the data related to the links between the components, and the data related to the constraints of the links; and the controller 30 selects candidates of the combination based on the request accepted from the user and the rules related to the component combinations generated from the configuration information. By using such a configuration, the causal relationship of the combination rules of the part combinations generated by the configurator can be visualized, and the maintainability of the configurator can be increased.

The configuration information 41 stored in the storage part 40 may be defined using a modeling language. As a result, a complex system that includes the components of the target product, the links between the components, and the constraints between the links can be abstracted and visualized, and it is easy to understand the structure and interrelationships of the entire system.

The data related to the components includes one or more parameters associated with the components; and the data related to the constraints includes constraint conditions, which are conditions related to the one or more parameters. The constraints on the parameters included in the components of the target product can be accurately ascertained thereby.

The request includes a request condition, which is a condition related to the one or more parameters; and the controller selects candidates of the combination based on the request condition included in the request accepted from the user and based on the one or more parameters associated with the components. As a result, combinations of the components of the target product that satisfy the request from the user can be selected based on quantitative conditions; and feasible combinations can be accurately selected.

2. Second Embodiment

Figure 10:
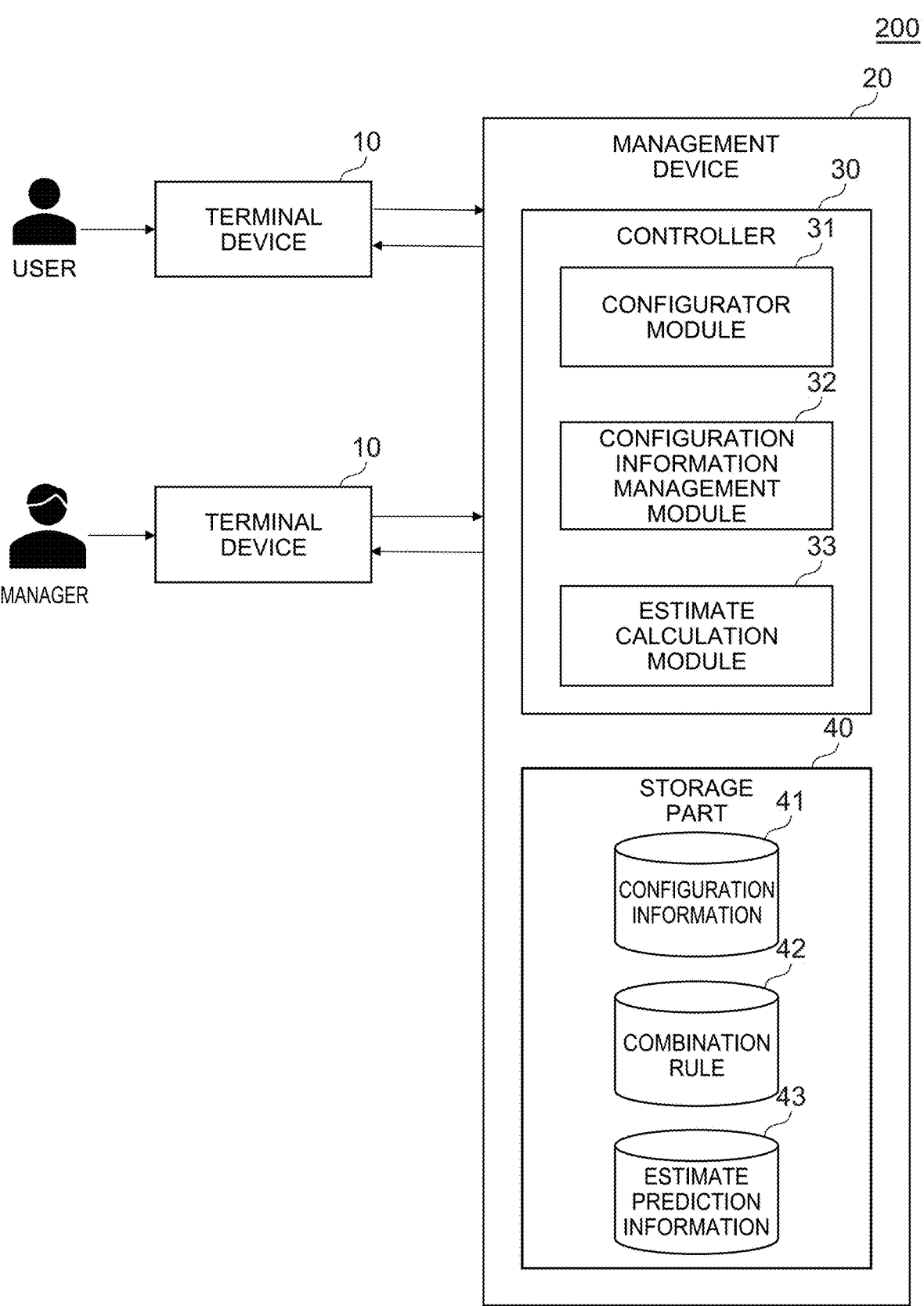
FIG. 10 is a block diagram showing a functional configuration of a management system according to a second embodiment.

A management system 200 according to a second embodiment of the disclosure will now be described with reference to FIGS. 10 to 14, with focus on differences with the first embodiment. As shown in FIG. 10, the storage part 40 of the management system 200 includes estimate prediction information 43. Herein, "predict" means to guess or estimate based on, for example, incomplete information, etc. "Estimate" means a prediction or projection of how much something will cost. When the estimate calculation module 33 of the controller 30 of the management system 200 will calculate the estimate related to the selected combination, and when information of a lower-level component of the combination is undetermined, the estimate calculation module 33 predicts the estimate for the lower-level component based on information of a higher-level component.

Figure 11:
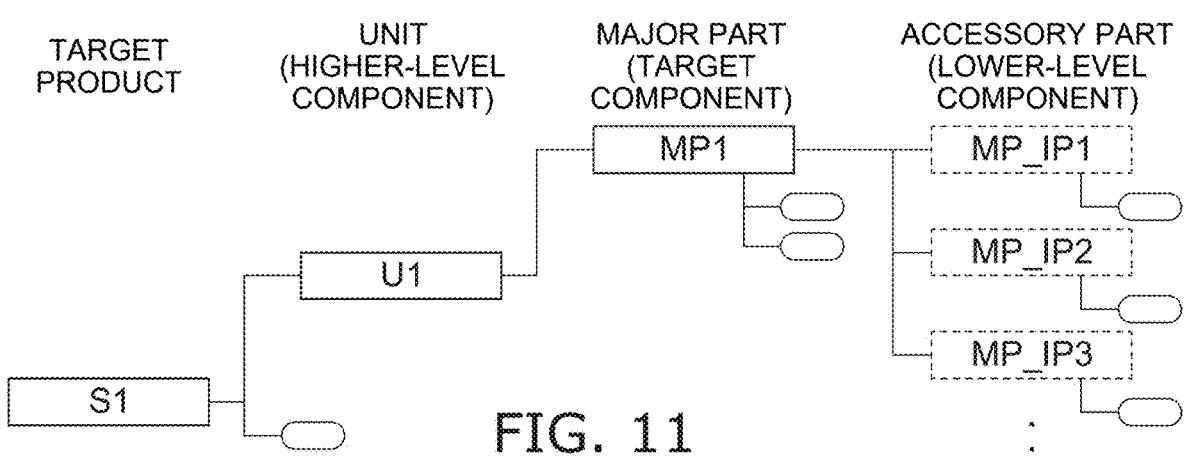
FIG. 11 shows an overview of predicting an estimate according to the second embodiment.

Specifically, in an example shown in FIG. 11, a target product S1 includes a unit U1; the unit U1 includes a major part MP1; and the major part MP1 includes one of an accessory part MP_IP1, an accessory part MP_IP2, or an accessory part MP_IP3. Here, when it is undetermined which accessory part is included in the major part MP1, the estimate calculation module 33 calculates the estimate amount of the major part MP1 by referring to the estimate prediction information 43 to predict estimate amounts of undetermined accessory parts.

Figure 12:
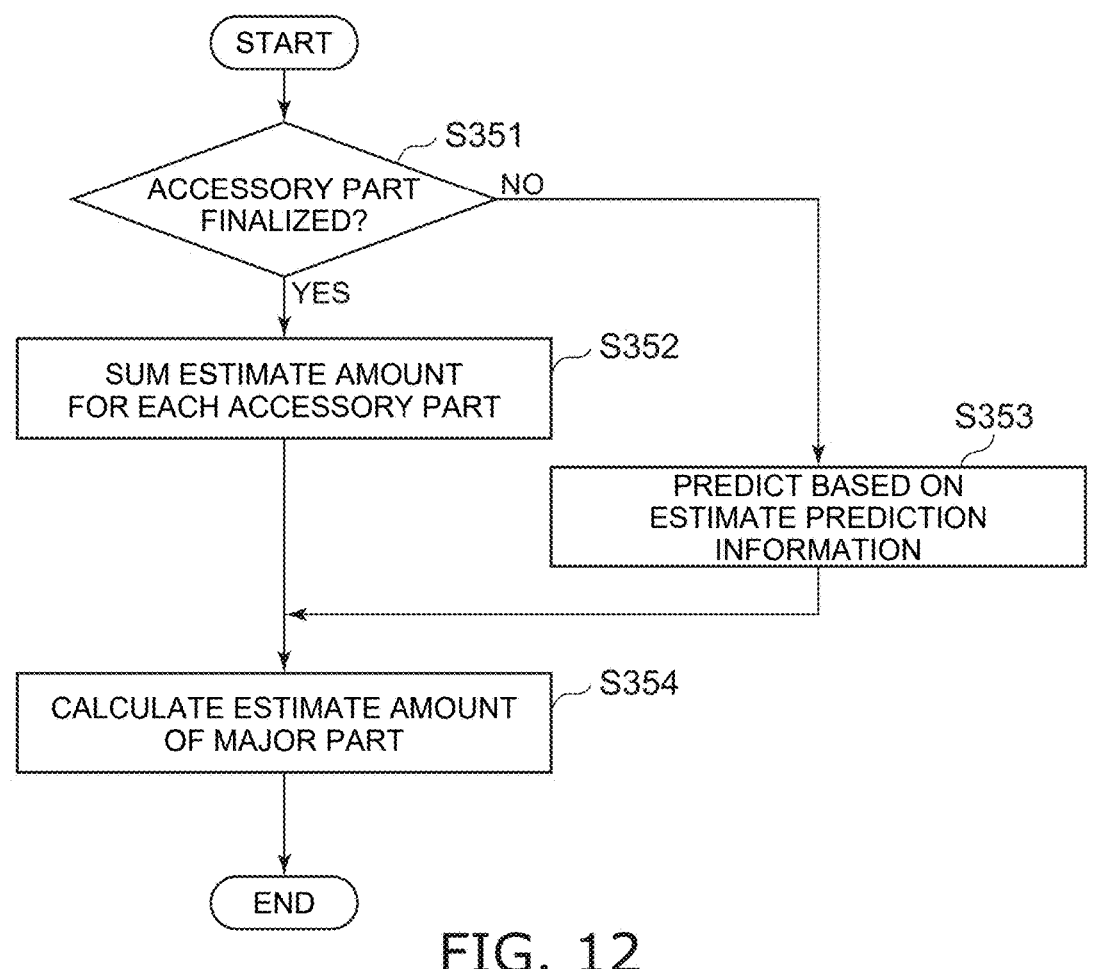
FIG. 12 is a flowchart showing the flow of estimate calculation processing according to the second embodiment.

The flow of the processing of the estimate calculation module 33 of the management system 200 will now be described with reference to FIG. 12. In step S351, the estimate calculation module 33 determines whether or not the accessory parts included in the major parts included in the combination of parts of the target product of the estimate are finalized. When the accessory parts are finalized (YES in step S351), step S352 is performed. On the other hand, when the accessory parts are not finalized (NO in step S351), step S353 is performed.

In step S352, the estimate calculation module 33 sums the estimate amounts of the accessory parts included in the major parts included in the combination.

Figure 13A:
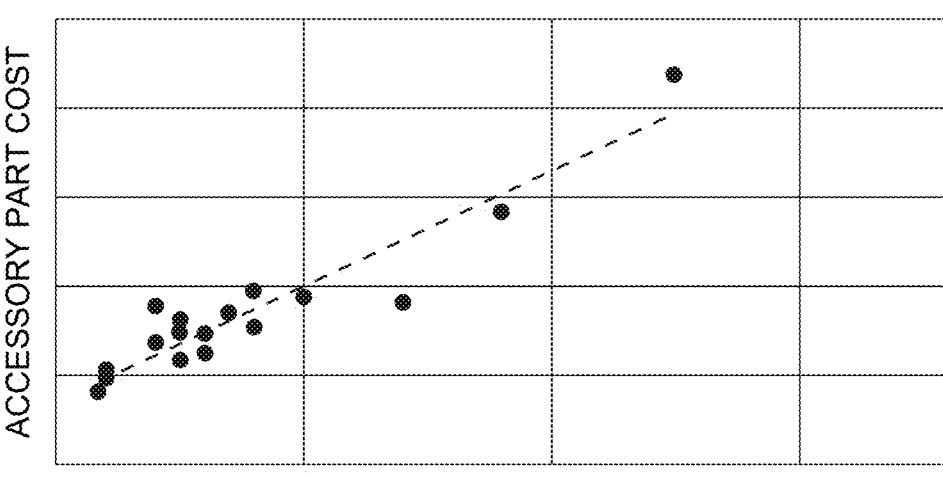
FIG. 13A shows an example of estimate prediction information.

In step S353, the estimate calculation module 33 refers to the estimate prediction information 43 and predicts the estimate amounts of the undetermined accessory parts. As shown in FIG. 13A, the estimate prediction information 43 may be, for example, data of a correlation between the accessory part cost and a predetermined parameter (hereinbelow, called the major part parameter) related to the major part.

The major part parameter is related to the major part, and can be set to be an appropriate parameter having a correlation with the cost of the accessory part included in the major part. As an example, when the major part is a housing cover, and the accessory part is a housing cover set screw, the major part parameter may be a parameter, such as the size of the housing cover, that has a correlation with the cost due to the quantity of housing cover set screws of the accessory part. Or, the major part parameter may be a parameter, such as the weight of the housing cover, that has a correlation with the work cost when mounting the housing cover set screws of the accessory part.

Figure 13B:
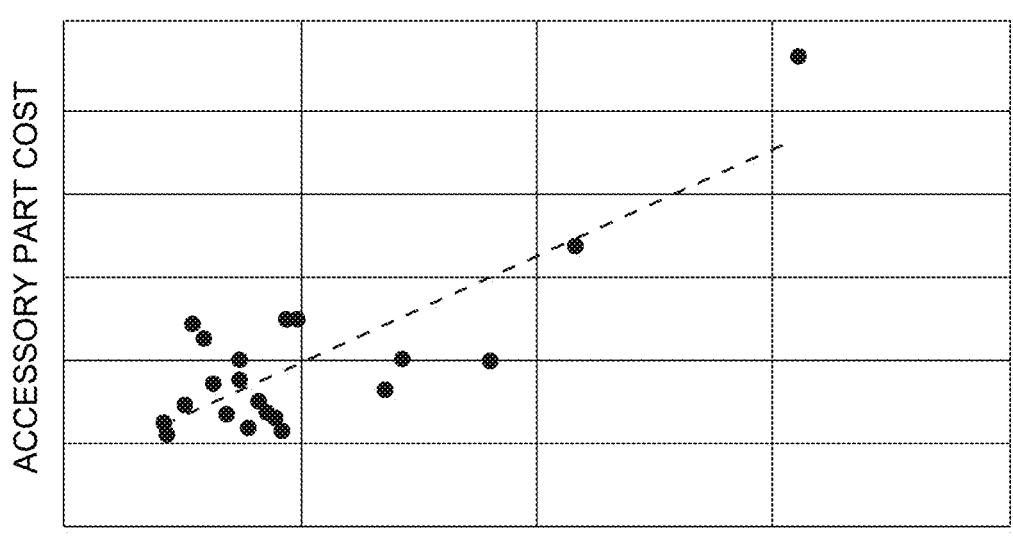
FIG. 13B shows another example of an estimate prediction information.

Or, as shown in FIG. 13B, the estimate prediction information 43 may be data of a correlation between the accessory part cost and a predetermined parameter (hereinbelow, called a unit parameter) related to the unit included in the major part. Thus, when there is a unit parameter that has a correlation with the accessory part cost, the accessory part cost may be predicted based on the unit parameter.

In step S354, the estimate calculation module 33 calculates the estimate amount of the major part based on the estimate amounts of the accessory parts calculated in the preceding processing (S352 or S353). As a result, the estimate amount of the major part can be calculated even when an accessory part is undetermined.

Figure 14:
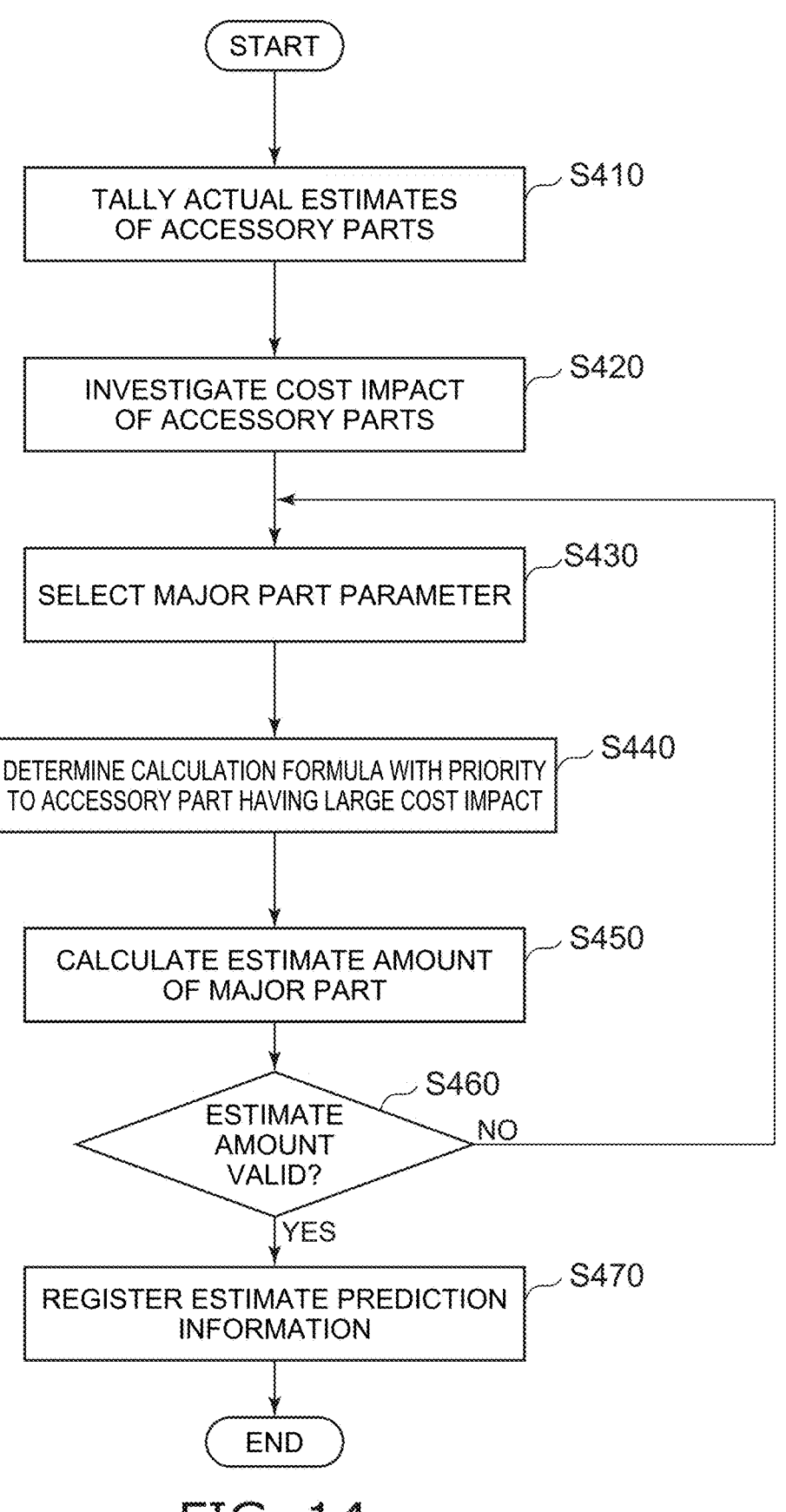
FIG. 14 is a flowchart describing the flow of generation processing of the estimate prediction information.

The flow of processing that generates the estimate prediction information 43 will now be described with reference to FIG. 14. In step S410, the estimate calculation module 33 tallies actual estimates of accessory parts. Specifically, the estimate amounts of multiple accessory parts included in the target major part and the actual result of the estimate amount of the major part for which the estimate amounts are summed is tallied.

In step S420, the estimate calculation module 33 investigates the cost impact of the multiple accessory parts included in the major part. Specifically, an accessory part among the multiple accessory parts included in the major part that has a large cost impact on the major part is determined.

In step S430, the estimate calculation module 33 selects the major part parameter. Specifically, a major part parameter that has a correlation with the accessory part cost is selected based on the tally result of step S410.

In step S440, the estimate calculation module 33 determines a calculation formula of an estimate amount of an accessory part with priority to an accessory part that has a large cost impact. As an example, the calculation formula is determined as a function having the major part parameter selected in step S430 as a variable.

In step S450, the estimate calculation module 33 calculates the estimate amount of the major part. Specifically, the calculation formula determined in step S440 is used to predict the estimate amount of the accessory part based on the major part parameter of the major part.

In step S460, the estimate calculation module 33 determines whether or not the estimate amount predicted in step S450 is valid. Step S470 is performed when the estimate amount is valid (YES in step S460). On the other hand, step S430 is performed again when the estimate amount is invalid (NO in step S460).

In step S470, the estimate calculation module 33 registers, in the storage part 40, the calculation formula of the estimate amount of the accessory part determined in step S440 as the estimate prediction information 43.

3. Other Embodiments

Although the management system 100 according to the embodiment is described above, applications of the technical idea of the disclosure are not limited to the embodiments above. For example, the configuration information 41 is defined using a modeling language in the embodiments above, but is not limited to such an example. In other words, a technique other than a modeling language may be used to define the data related to the components of the product, the data related to the links between the components, and the data related to the constraints of the links.

Although the management device 20 includes the storage part 40 that stores the configuration information 41 and the combination rule 42 in the embodiments above, the embodiments are not limited to such an example. In other words, at least one of the configuration information 41 or the combination rule 42 may be stored in another storage medium; and the controller 30 may perform the processing described above by referring to the storage medium. This is similar for the estimate prediction information 43 as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments herein may be made without departing from the spirit of the inventions. The accompanying claims and their equivalents are intended to cover such forms or modifications as would fall within the scope and spirit of the inventions.

The disclosure may include the following features.

Note 1

A management system of a configurator configured to select a candidate of a combination of components included in a product, the system comprising:

a storage part configured to store configuration information defining
  data related to the components,
  data related to a link between the components, and
  data related to a constraint of the link; and
 a controller configured to select the candidate of the combination based on
  a request accepted from a user, and
  a rule related to the combination of the components generated from the configuration information.

Note 2

The system according to Note 1, wherein
 the data related to the components includes one or more parameters associated with the components,
 the data related to the constraint includes a constraint condition, and
 the constraint condition is a condition related to the one or more parameters.

Note 3

The system according to Note 2, wherein
 the request includes a request condition,
 the request condition is a condition related to the one or more parameters, and
 the controller selects the candidate of the combination based on
  the request condition included in the request accepted from the user, and
  the one or more parameters associated with the components.

Note 4

The system according to any one of Note 1 to Note 3, wherein
  the controller calculates an estimate related to the selected combination, and
  when a lower-level component of the combination is undetermined, the controller predicts an estimate of the lower-level component based on information of a higher-level component.

Note 5

An information processing device configured to manage a configurator, the configurator being configured to select a candidate of a combination of components included in a product, the information processing device comprising:
  a storage part configured to store configuration information defining
   data related to the components,
   data related to a link between the components, and
   data related to a constraint of the link; and a controller configured to select the candidate of the combination based on
  a request accepted from a user, and
  a rule related to the combination of the components generated from the configuration information.
Note 6

A program configured to cause an information processing device to manage a configurator,
  the configurator being configured to select a candidate of a combination of components included in a product,
  the information processing device including a storage part and a controller,
  the program, when executed by the information processing device, causing the information processing device to:
    cause the storage part to store configuration information defining
      data related to the components,
      data related to a link between the components, and
      data related to a constraint of the link; and
    cause the controller to select the candidate of the combination based on
      a request accepted from a user, and
      a rule related to the combination of the components generated from the configuration information.

What is claimed is:

1. A management system of a configurator configured to select a candidate of a combination of components included in a product, the system comprising:
  a storage part configured to store configuration information defining
    first data related to the components, the first data including an estimate amount of each of the components and one or more parameters associated with the components,
    second data related to a link between the components, and
    a plurality of sets of third data related to constraints of the link; and
  a controller comprising one or more processors and a memory storing instructions that, when executed by the one or more processors, cause the one or more processors to perform:
    generating a rule related to the combination based on the configuration information,
    determining whether or not the rule is appropriate,
    when the rule is not determined to be appropriate, updating the configuration information and the rule repeatedly until the rule is determined to be appropriate,
    accepting a user request including a request condition related to the parameters,
    selecting the candidate based on the user request and the rule which is determined to be appropriate, and
    displaying the selected candidate.

2. The system according to claim 1, wherein
  the plurality of sets of third data include constraint conditions, and
  the constraint conditions are conditions related to the one or more parameters.

3. The system according to claim 1, wherein
  the one or more processors are caused to perform calculating an estimate related to the selected combination, and
  when a lower-level component of the combination is undetermined, the one or more processors are caused to perform predicting an estimate of the lower-level component based on information of a higher-level component.

4. An information processing device configured to manage a configurator, the configurator being configured to select a candidate of a combination of components included in a product, the information processing device comprising:
  a storage part configured to store configuration information defining
    first data related to the components, the first data including estimate amount of each of the components and one or more parameters associated with the components,
    second data related to a link between the components, and
    a plurality of sets of third data related to constraints of the link; and
  a controller comprising one or more processors and a memory storing instructions that, when executed by the one or more processors, cause the one or more processors to perform
    generating a rule related to the combination based on the configuration information,
    determining whether or not the rule is appropriate,
    when the rule is not determined to be appropriate, updating the configuration information and the rule repeatedly until the rule is determined to be appropriate,
    accepting a user request including a request condition related to the parameters,
    selecting the candidate based on the user request and the rule which is determined to be appropriate,
    displaying the selected candidate.

5. A non-transitory computer-readable storage medium storing a program configured to cause an information processing device to manage a configurator,
  the configurator being configured to select a candidate of a combination of components included in a product,
  the information processing device including a storage part and a controller,
  the program, when executed by the information processing device, causing the information processing device to:
    cause the storage part to store configuration information defining
      first data related to the components, the first data including estimate amount of each of the components and one or more parameters associated with the components,
      second data related to a link between the components, and
      a plurality of sets of third data related to constraints of the link; and
    cause the controller to
      generate a rule related to the combination based on the configuration information,
      determine whether or not the rule is appropriate,
      when the rule is not determined to be appropriate, update the configuration information and the rule repeatedly until the rule is determined to be appropriate,
      accept a user request including a request condition related to the parameters,
      select the candidate based on the user request and the rule which is determined to be appropriate,
      display the selected candidate.

* * * * *